United States Patent
Tanaka et al.

(10) Patent No.: US 7,083,727 B2
(45) Date of Patent: Aug. 1, 2006

(54) WATER CLARIFYING AGENT INDUCING CATALYTIC REACTION AND METHOD OF CLARIFYING WATER THROUGH ACTIVATION OF MICROORGANISM

(75) Inventors: Yorio Tanaka, Hiroshima (JP); Morio Nishimura, Hiroshima (JP)

(73) Assignee: Minaki Advance Co., Ltd., Hiroshima (JP)

(*) Notice: Subject to any disclaimer, the term of this patent is extended or adjusted under 35 U.S.C. 154(b) by 0 days.

(21) Appl. No.: 10/514,244

(22) PCT Filed: Apr. 18, 2003

(86) PCT No.: PCT/JP03/04959

§ 371 (c)(1),
(2), (4) Date: Nov. 22, 2004

(87) PCT Pub. No.: WO03/099730

PCT Pub. Date: Dec. 4, 2003

(65) Prior Publication Data

US 2005/0173340 A1    Aug. 11, 2005

(30) Foreign Application Priority Data

May 23, 2002    (JP) .................... 2002-148968

(51) Int. Cl.
*C02F 3/00* (2006.01)

(52) U.S. Cl. .................................. 210/606; 210/170
(58) Field of Classification Search ............... 210/606, 210/170
See application file for complete search history.

(56) References Cited

U.S. PATENT DOCUMENTS

| | | | |
|---|---|---|---|
| 3,635,797 A | * | 1/1972 | Battistoni et al. ........... 210/632 |
| 3,915,853 A | * | 10/1975 | Luck .......................... 210/606 |
| 4,318,990 A | * | 3/1982 | Thomson et al. ........... 435/219 |
| 5,160,488 A | | 11/1992 | Stillman .................. 435/262.5 |

FOREIGN PATENT DOCUMENTS

| | | |
|---|---|---|
| DE | 1 961 515 | 6/1971 |
| GB | 1175912 | 1/1970 |
| JP | 56-73535 | 6/1981 |
| JP | 59-6982 | 1/1984 |
| JP | 62-27096 | 2/1987 |
| JP | 05-168456 | 7/1993 |

(Continued)

OTHER PUBLICATIONS

Copy of European Search Report dated Jan. 11, 2006, 3 pages.

*Primary Examiner*—Chester T. Barry
(74) *Attorney, Agent, or Firm*—Armstrong, Kratz, Quintos, Hanson & Brooks, LLP (57) ABSTRACT

This invention employs natural enzymes to activate microbes that break down sludge and toxic substances such as organic compounds existent in polluted water, while at the same time being easily employed on rivers, lakes and water treatment plants. A water purification agent is disseminated via a process of drip distribution into polluted water, resulting in the activation of microbes, which, through their activities, purify the polluted water. The water purification agent is comprised of a mixture of the following: natural enzymes, which, when introduced into polluted water, activate microbes that break down sludge and toxic substances such as organic compounds and sulfides, leading to purification of the water; and a solution of yeast in citric acid water, which facilitates a catalytic reaction that enables the microbes in polluted water to be activated.

6 Claims, 12 Drawing Sheets

FOREIGN PATENT DOCUMENTS

| | | |
|---|---|---|
| JP | 6-170387 | 6/1994 |
| JP | 07-274942 | 10/1995 |
| JP | 10-263569 | 10/1998 |
| JP | 10-298948 | 11/1998 |
| JP | 2000-217573 | 8/2000 |

* cited by examiner

Fig.4
Region of Polluted Water
(Before Dissemination of the Water Purification Agent.)

Region S: The Aerobic Water Region near the Surface of the Water.
DO: Dissolved Oxygen (Representing $O_2(aq)$), or Dissolved Oxygen Concentration
Org: Organic Matter, Organic Compounds ($C_aH_bO_cN_dP_eS_r$)
$P \rightarrow O$ Occurs This is Region S Region S (In an Aerobic State) { Region S Shrinks as Pollution Progresses }

(In an Anaerobic State)
$DO = 0$

Partial Decomposition
Org $\longrightarrow$ $CO_2$, $CH_4$, $NH_3$, $H_2S$ (In an Anaerobic State) Built-up Sludge
Partial Decomposition
Org $\longrightarrow$ $CO_2$, $CH_4$, $NH_3$, $H_2S$

Phase 2 (Water Purification II)

Testing Volumes  50L of Contaminated Sludge  50 L of Polluted Water
50 cc / Day of Water Purification Agent  Aeration

| Items | Units | Start of Test | After 1 Week | After 1 Month | After 3 Months |
|---|---|---|---|---|---|
| Appearance | | Black | Black | Blackish Grey | Grey |
| Odor | | Sludge Odor, Organic Solvent Odor | Sludge Odor, Organic Solvent Odor | Sludge Odor Organic Solvent Odor | Sludge Odor |
| Actual Water Content | % | 54.4 | 48.5 | 63.0 | 71.4 |
| ORP | mv | -450 | -480 | -210 | -40 |
| COD | mg/L | 63.5 | 66.0 | 39.0 | 22.8 |
| NH4-N | mg/L | 0.43 | 0.37 | 0.23 | 0.14 |
| TN | mg/L | 9.95 | 9.40 | 7.90 | 6.41 |
| TP | mg/L | 2.93 | 2.93 | 2.58 | 2.30 |
| Ignition Loss | % | 13.2 | 10.9 | 11.7 | 13.9 |
| Sulfides | mg/L | 4.3 | | 3.1 | 0.8 |

(a) Before the Experiment (b) Fermentation Bubbles (c) Denitrification

(d) Breaking Down of Sludge (e) Light Blue Color During Experiment (f) Algae Being Formed at the Bottom of the River

WATER CLARIFYING AGENT INDUCING CATALYTIC REACTION AND METHOD OF CLARIFYING WATER THROUGH ACTIVATION OF MICROORGANISM

BACKGROUND OF THE INVENTION

1. Field of the Invention

This present invention relates to a water purification agent employing a catalytic reaction, and a method of water purification employing the activation of microbes, where the water purification agent and the water purification method purify polluted water, including, but not limited to, sewage and industrial effluent, by using enzymes to activate microbes existent in the polluted water that break down toxic substances and affect the reduction of oxidized water.

2. Description of the Prior Art

Traditionally, the process of purifying water polluted with toxic substances such as organic compounds, nitrogen oxides and sulfides, which frequently originate from sewage and industrial effluent, has involved a number of different methods, including the activated sludge method and trickling filter method. The activated sludge method involves the aeration of sewage and other forms of polluted water, which facilitates the growth of aerobic bacteria in the polluted water, leading to the agglomeration and settling of suspended solids. When agglomerated, the suspended solids absorb pollutants from the water, giving one method for purifying polluted water.

The trickling filter method also utilizes aerobic bacteria to effect the purification of sewage and other forms of polluted water. With this method however, polluted water is sprinkled evenly on a filter bed covered with broken stones or some other porous material, and the flow of the polluted water results in growth of a microbial film that purifies the water on the surface of the filter bed, giving yet another method for purifying water. Several varieties of microbes existent in this microbial film break down contaminants existent in polluted water and transform sludge into substances such as carbon dioxide, water, nitrogen and ammonia, effecting the purification of the polluted water.

In addition to the above methods of purifying polluted water, for bodies of water such as rivers, lakes, dams, bays, ports, harbors, and coastal waters where there are large deposits of sludge, the sludge is dredged and then disposed of, while at sewage plants, the sludge generated during sewage treatment is transformed into coagulated sludge and then disposed of. Sludge dredged or coagulated in these ways is disposed of through a process of incineration.

Because the aforementioned traditional purification methods necessitate the collection of polluted waters such as sewage, wastewater and industrial effluent into specific treatment facilities before initiation of the purification process, a major problem with these methods is low throughput. Another particular problem of the activated sludge method and the trickling filter method is that they cannot be used on publicly accessible bodies of water such as rivers or lakes; these water treatment facilities are, thus, limited in their effectiveness.

As it is necessary to collect the polluted water into specific disposal facilities before initiating the purification process, a further problem involves the resulting odors, including putrefaction odors, methane odors, hydrogen sulfide odors, food waste odors, and the odor of livestock excreta. These odors have a significantly negative impact on the areas surrounding the disposal facilities.

Also, with the traditional method of incineration for sludge dredged from rivers, lakes, dams, bays, ports, harbors and coastal waters, or sludge agglomerated from polluted water, in addition to the cost factor, the generation of carbon monoxide and dioxins may cause, in addition to water pollution, air pollution, resulting in negative effects on the environment.

The present invention has been created in order to overcome the aforementioned problems. The object of the present invention, which relates to a water purification agent employing catalytic reactions and a water purification method employing the activation of microbes, is to provide the purification of water by utilizing natural enzymes to activate microbes that break down sludge and toxic substances such as organic compounds, while also being easily employable at rivers, lakes and water treatment facilities.

DISCLOSURE OF THE INVENTION

The present invention relates to a water purification agent employing catalytic reactions of liquid form that, when disseminated into polluted water via a process of drip distribution, purifies the polluted water by breaking down pollutants contained therein, and that contains a mixture of the following: the enzyme bromelain extracted from pineapple juice, that, when the enzyme is introduced into polluted water, purifies the polluted water by activating microbes that break down sludge and pollutants including, but not limited to, organic compounds and sulfides; and a solution of yeast in citric acid water, which facilitates a catalytic reaction that enables the microbes in the polluted water to be activated.

As the aforementioned water purification agent is a mixture of not only the enzyme bromelain, but also a solution of yeast in citric acid water, which encourages a catalytic reaction that activates microbes existent in polluted water, cessation of activation does not occur easily. As a result, approximately three months after dissemination of small amounts of water purification agent into polluted water, a biosphere colony of the organisms existent in the polluted water is formed, providing an environment where microbes can survive easily. These microbes can purify water by independently taking in and expelling enzymes, carrying out decomposition reactions, breaking down toxic and other such substances, and carrying out the reduction of oxidized water. ********

Figure 3:
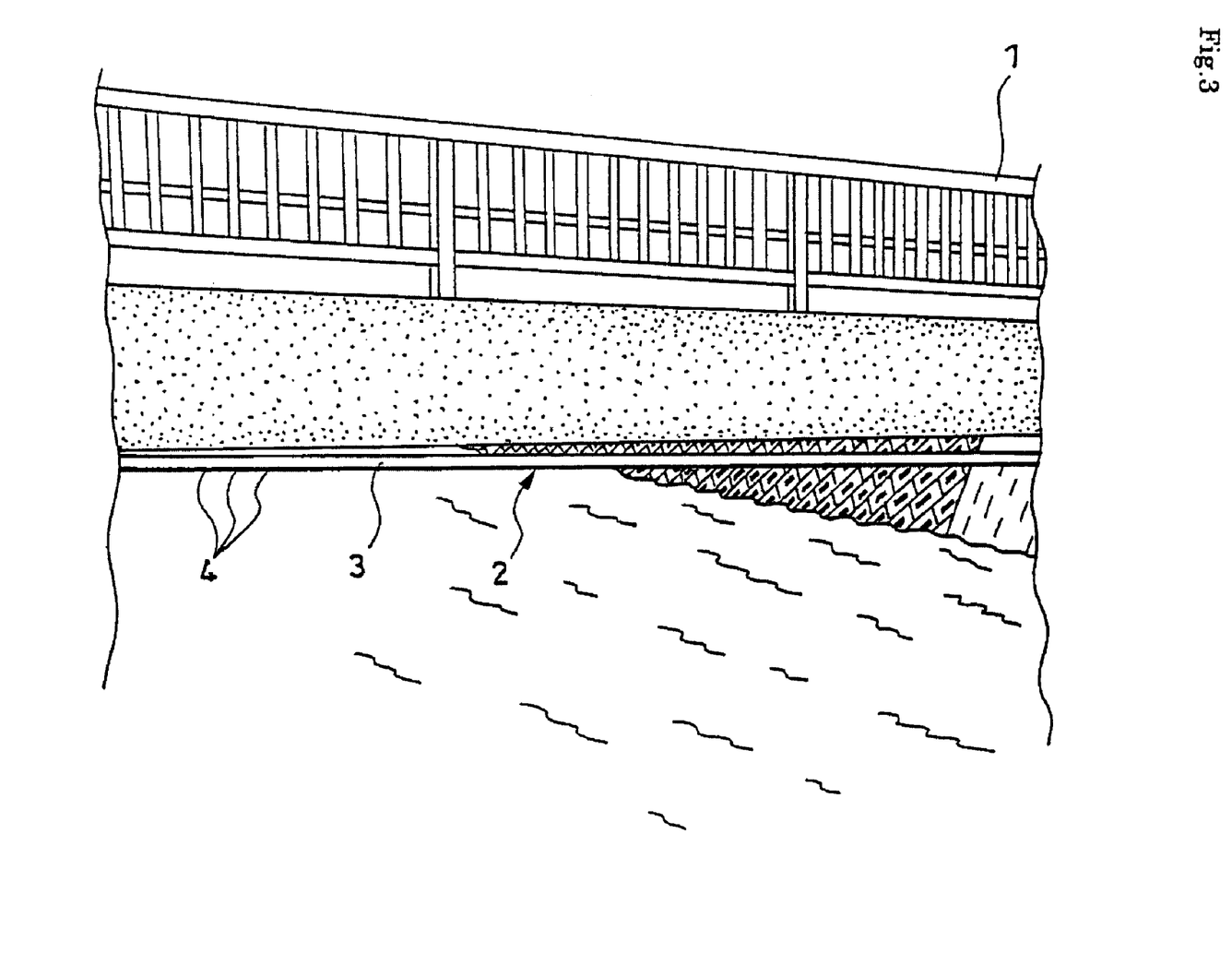
FIG. 3 is an oblique diagram that shows the drip distribution mechanism for the present invention, which is used to disseminate the water purification agent, as set up under a bridge.
Figure 4:
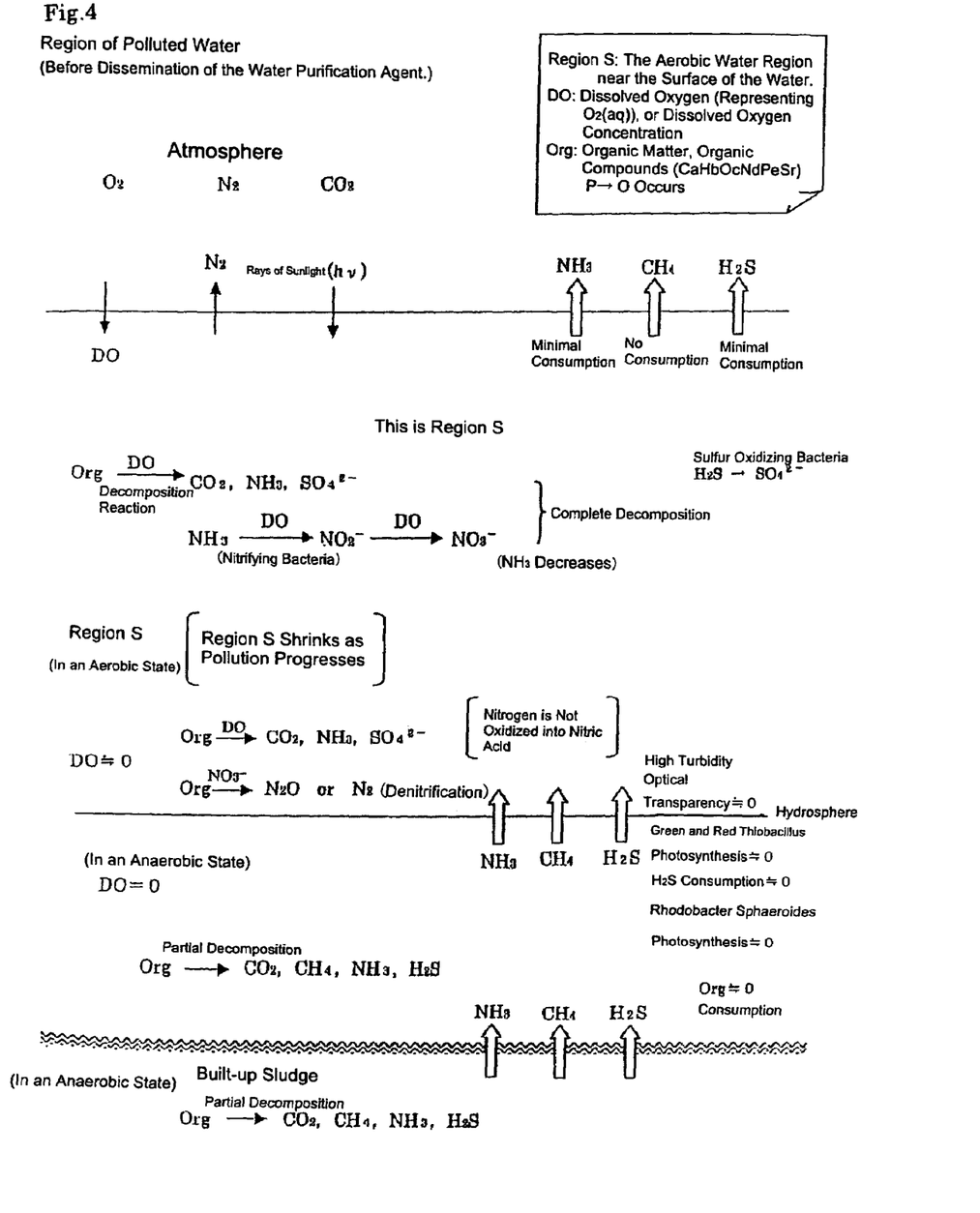
FIG. 4 is an explanatory diagram that illustrates the water purification system employing the activation of microbes in regions of polluted water, and shows the state prior to the dissemination of the water purification agent via a drip distribution process.
Figure 5:
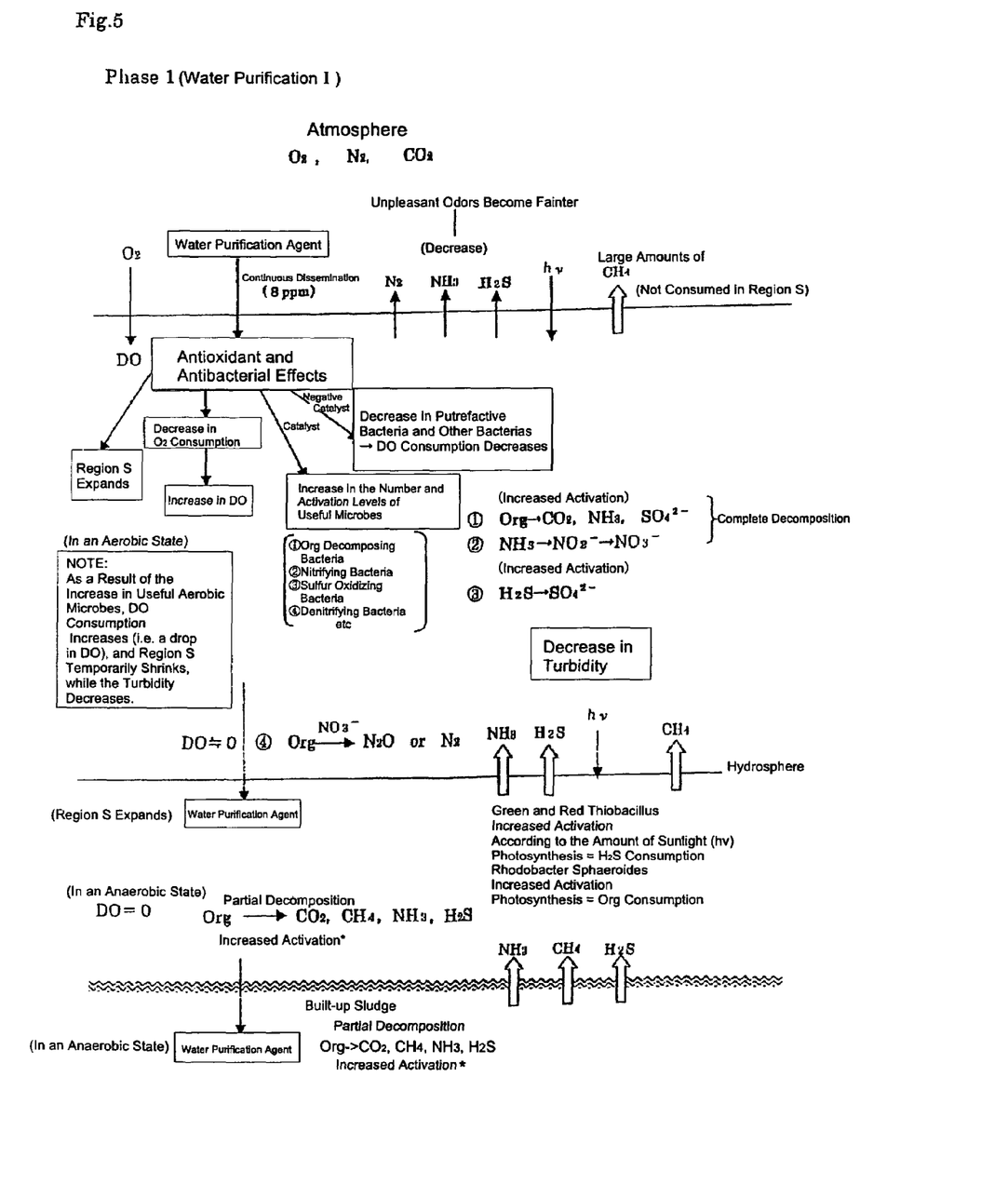
FIG. 5 is an explanatory diagram illustrating the water purification system employing the activation of microbes in polluted regions of water, and shows the first phase of the water purification process, where polluted water is starting to be purified through dissemination of the water purification agent into the polluted water via a drip distribution process.
Figure 6:
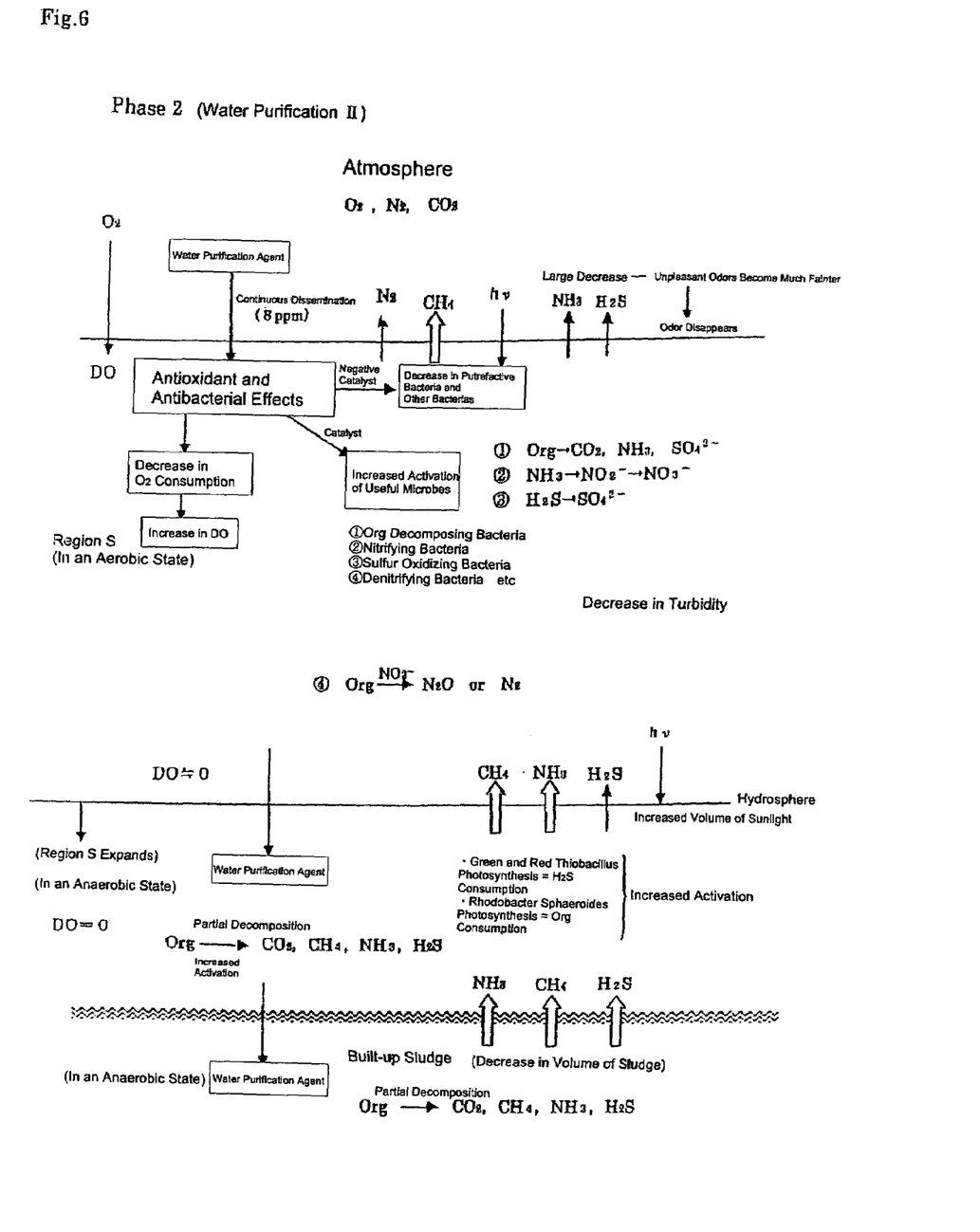
FIG. 6 is an explanatory diagram illustrating the water purification system employing the activation of microbes in polluted regions of water, and shows the second phase of the water purification process, where the polluted water has, to a certain degree, been purified through dissemination of the water purification agent via a drip distribution process.

The present invention also includes a water purification method employing the activation of microbes, where a drip distribution mechanism (2) attached to the underside of bridges or bridge-like structures (1) located in the vicinity of publicly accessible bodies of water is used to disseminate a water purification agent into polluted water via a process of drip distribution, affecting the activation of microbes that break down pollutants in the polluted water, which leads to the purification of the polluted water, where the bodies of water include, but are not limited to, rivers, lakes, dams, harbors, bays, and coastal waters, and where the water purification agent contains a mixture of the enzyme bromelain extracted from pineapple juice, and a solution of yeast in citric acid water, which facilitates a catalytic reaction that enables the microbes in the polluted water to be activated.

The aforementioned drip distribution mechanism (2) uses as a distribution pipe (3) a pipe that has multiple holes (4) for the purpose of drip distribution.

Dissemination of the aforementioned water purification agent via a drip distribution process into polluted water discharged from facilities set up at factories and worksites leads to the purification of the polluted water. Dissemination of the water purification agent into polluted water via a drip distribution process leads to the breakdown of sludge in polluted water. Dissemination of the water purification agent into polluted water via a drip distribution process results in the breakdown of toxic substances, such as organic matter and sulfides, and the reduction of oxidized water, facilitating purification of the water.

The water purification method disseminates the water purification agent into polluted water via a drip distribution process, meaning the water purification agent can be readily disseminated into publicly accessible bodies of water, such as rivers, lakes, dams, bays, harbors, ports, and coastal waters; once disseminated, the water purification agent can then activate microbes existent in the polluted water of these bodies of water. In addition, by using biochemical oxygen demand (BOD) readings and chemical oxygen demand (COD) readings, it is possible to determine and disseminate the exact amount of water purification agent necessary.

Disseminating the water purification via a drip distribution mechanism (2) having multiple holes (4) set up under bridges or bridge-like structures (1) allows the water purification agent to be disseminated evenly upon the surface of bodies of flowing water such as rivers.

DESCRIPTION OF THE PREFERRED EMBODIMENTS

The preferred embodiments of the present invention will be described in detail with reference to the accompanying drawings.

Figure 1:
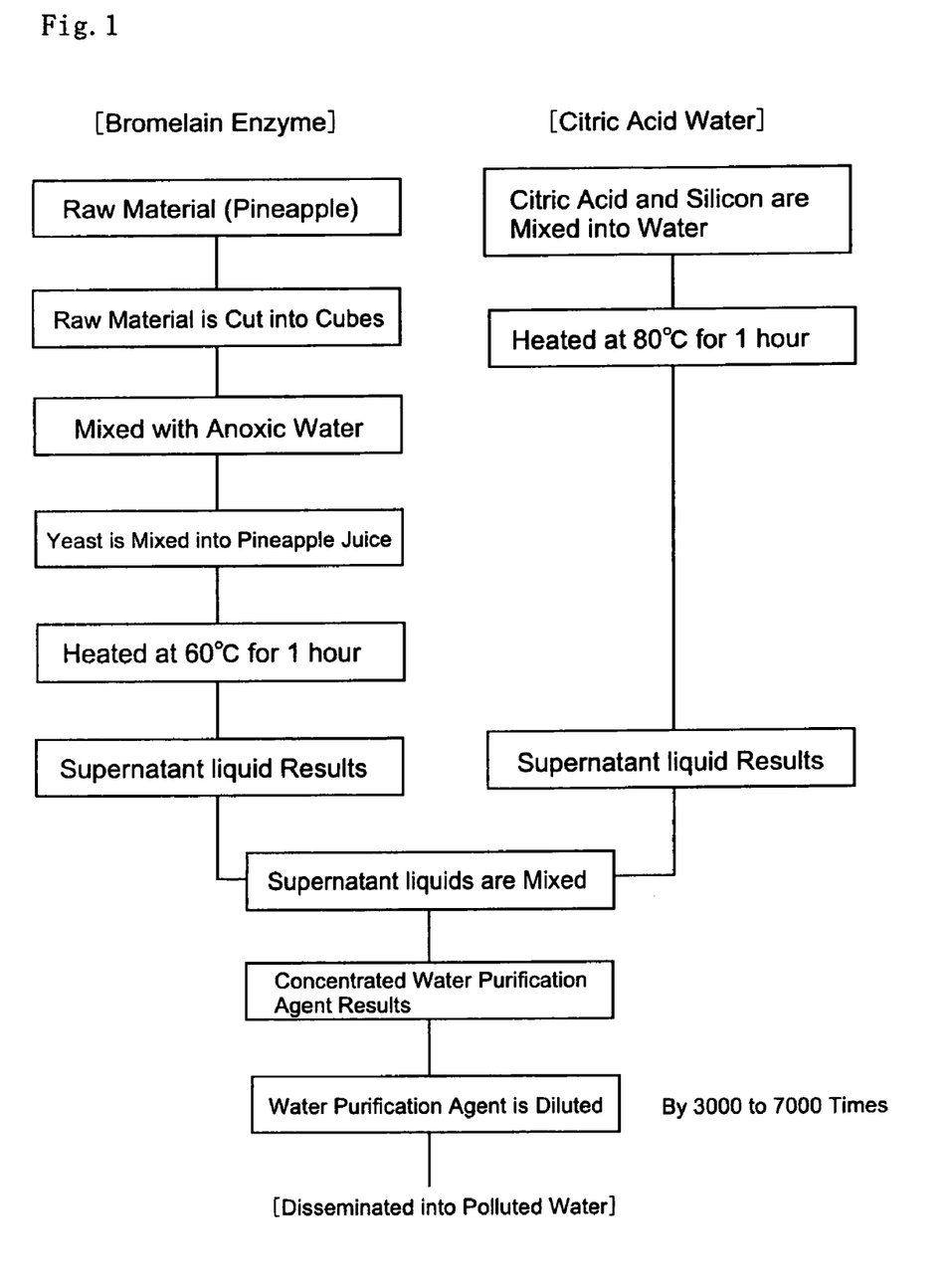
FIG. 1 is a block diagram illustrating how the water purification agent for,the present invention is produced.

FIG. 1 is a block diagram illustrating how the water purification agent for the present invention is produced The water purification agent for the present invention is a mixture of natural enzymes and yeast. When the natural enzymes are disseminated into polluted water existent in publicly accessible bodies of water, such as rivers, lakes, dams, harbors, bays, ports, and coastal waters, they activate microbes that purify the water by breaking down sludge and toxic substances, such as organic compounds and sulfides; yeast, meanwhile, enables the catalytic reactions that activate microbes existent in the polluted water. One example of such a natural enzyme is bromelain, which can be extracted from pineapple juice. ********

The water purification agent for the present invention can be produced by following the procedures illustrated in FIG. 1.

Unripe green pineapples should be used as the source material for bromelain, as the enzymes in ripe yellow pineapples are often denatured, making it impossible to extract abundant amounts of bromelain. The green pineapples are cut into 3 to 5 centimeter cubes, including the high-fiber cores of the pineapples. The cubes are then mixed with anoxic water or bottom water to make pineapple juice. Anoxic or bottom water is used instead of tap water, which contains chlorine, in order to enhance the clarity of the solution. For one pineapple (about 1 kilogram) 5 L of anoxic water is used.

Next, the kind of yeast used to make bread is mixed into the pineapple juice. Typically, 50 cc of yeast (1 g in powder form) is stirred into 5 L of the pineapple juice. Heating the solution at 65° C. for approximately one hour produces the desired pineapple water solution.

Further, citric acid (approximately 30 g), which enables certain catalytic reactions, is stirred with silicon (approximately 30 g) simultaneously into water, and then heated at 80° C. for approximately one hour to produce citric acid water.

By mixing the supernatant liquid of the citric acid water with the supernatant liquid of the aforementioned pineapple water solution, the enzyme bromelain can be extracted from the pineapple juice, producing the water purification agent.

\*\*\*\*\*\*\*\* One pineapple provides about 7 L of concentrated water purification agent, which is used at a dilution ratio of 3000:1 to 7000:1.

The water purification agent for the present invention uses natural enzymes; as long as the enzymes are combined with \*\*\*\*\*\*\*\* a solution of yeast and citric acid water, a solution which activates microbes by enabling catalytic reactions, the type of enzyme is not limited to bromelain extracted from pineapple juice. In fact, as long as the enzymes are easily extractable and are derived from inexpensive raw materials, several different kinds of enzymes can be used, including papain from papayas, cathepsins from animal cells, and phosphatases from plant cells.

Figure 2:
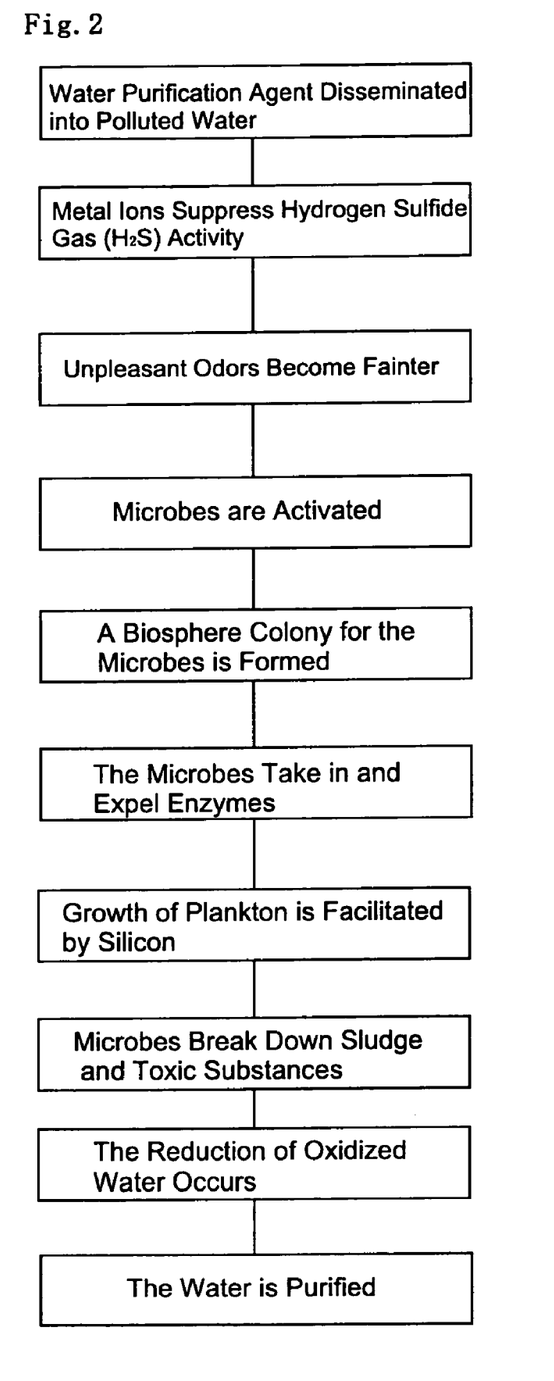
FIG. 2 is a flow chart demonstrating how the present invention uses catalytic reactions to activate microbes.

FIG. 2 is a flow chart demonstrating how the present invention uses catalytic reactions to activate microbes.

Figure 7:
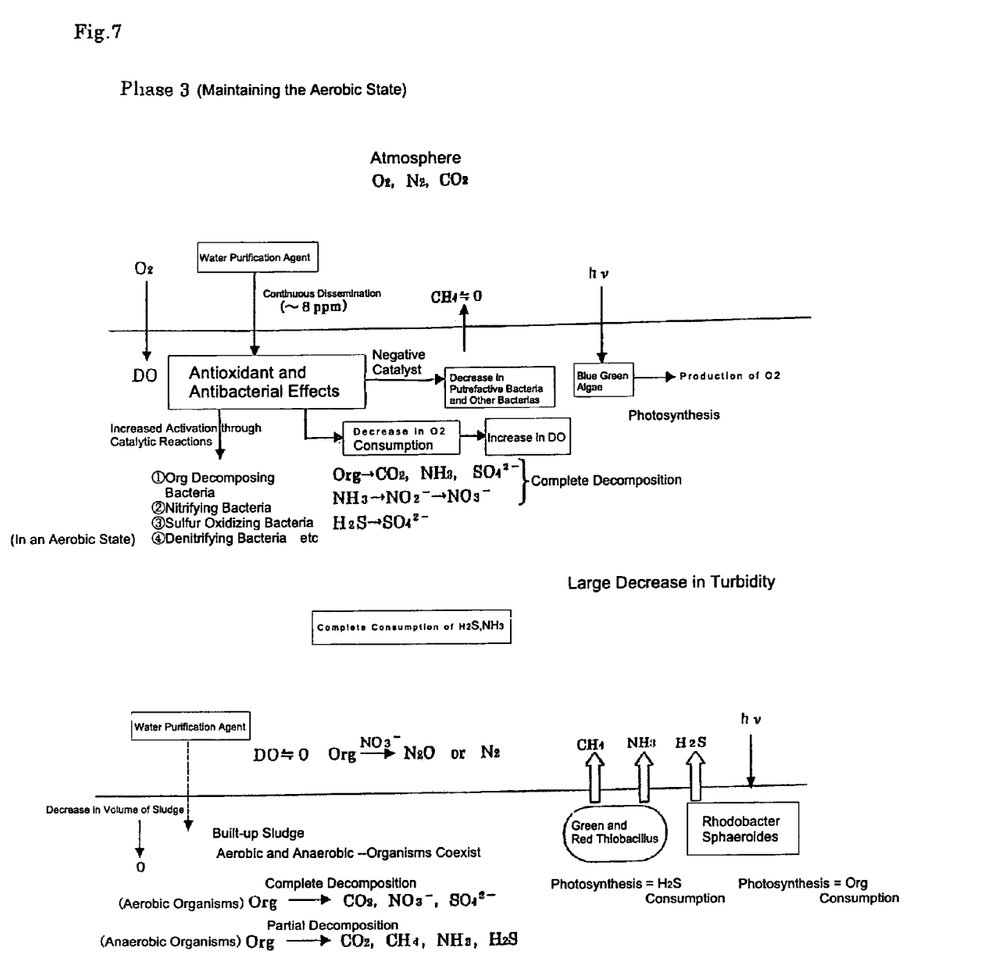
FIG. 7 is an explanatory diagram illustrating the water purification system employing the activation of microbes in polluted regions of water, and shows the third phase of the water purification process, where polluted water is returned to an aerobic state through dissemination of the water purification agent via a drip distribution process.

The water purification agent for the present invention is a mixture of not only bromelain, but also substances such as yeast, which enable catalytic reactions that activate microbes in the polluted water existent in bodies of water such as rivers, lakes, dams, bays, ports, harbors, and coastal waters; this ensures that cessation of activation does not occur easily. ******** Approximately three months after dissemination of small amounts of water purification agent into polluted water, unpleasant odors become fainter, microbes have become activated, and a biosphere colony of the organisms existent in the polluted water is formed, where these microbes can easily survive. These microbes can purify water by independently taking in and expelling enzymes, carrying out decomposition reactions, breaking down toxic and other such substances, and carrying out the reduction of oxidized water.

FIG. 3 is an oblique diagram that shows the drip distribution mechanism for the present invention, which is used to disseminate the water purification agent, as set up under a bridge.

The water purification agent is disseminated via a process of drip distribution onto the surface of bodies of water using a drip distribution mechanism (2) set up under bridges or bridge-like structures (1) in the vicinity of rivers, lakes, dams, bays, ports, harbors, and coastal waters. The drip distribution mechanism (2) uses as a distribution pipe (3) a pipe that has multiple holes (4) for the purpose of drip distribution. The water purification agent is supplied through a pipe to the drip distribution mechanism (2) located on the underside of bridges or bridge-like structures (1) from a holding tank containing the water purification agent set up in a location separate from the bridge structure. The holding tank has control valves, which control the amount of water purification agent that is disseminated to the surface of the water through the holes (4) of the drip distribution mechanism (2).

A control unit automatically determines the amount of water purification agent disseminated into the water. Further, by using BOD and COD readings from the polluted water existent in bodies of water such as rivers, the purity of the water, in terms of the pollution level in the water, can be determined, and, by using this measurement, the exact amount of water purification agent necessary to purify the water can be calculated; that amount can then be disseminated into the water via a drip distribution process.

In this way, the water purification agent can be applied evenly to running bodies of water such as rivers, as precise amounts of water purification agent can be disseminated via the drip distribution process.

FIGS. 4 to 7 are explanatory diagrams that illustrate the water purification system employing the activation of microbes in regions of polluted water. For each diagram, the atmosphere is represented at the top, and the hydrosphere in the middle. The hydrosphere contains an aerobic water region near the surface of the water, denoted Region S, an anaerobic water region represented below the aerobic water region, and layers of sludge represented at the bottom.

FIG. 4 shows the state prior to the dissemination via a drip distribution process of the water purification agent for the present invention.

At this stage, water pollution has already advanced, and at the bottom of the water in the anaerobic region layers of sludge composed of organic matter and organic compounds have built up. This sludge partly decomposes into substances such as carbon dioxide ($CO_2$), methane gas ($CH_4$), ammonia gas ($NH_3$), and hydrogen sulfide gas ($H_2S$). Significantly, Dissolved Oxygen (DO) levels are at almost 0 ppm.

Gases such as carbon dioxide, methane gas, ammonia gas and hydrogen sulfide gas are broken down in the aerobic water region, denoted Region S, near the surface of the water. However, as water pollution develops, Region S becomes smaller and, as a result, gases such as carbon dioxide, methane gas, ammonia gas and hydrogen sulfide gas are released directly into the atmosphere, giving rise to unpleasant odors.

FIG. 5 shows the first phase of the water purification process, where polluted water is starting to be purified through dissemination of the purification agent into the polluted water via a drip distribution process.

When disseminated via a process of drip distribution onto the surface water of Region S, the water purification agent produces antioxidant and antibacterial effects, creating catalytic reactions that increase the number of the useful microbes, as well as the level of activity of these microbes. In addition, the catalytic reactions lead to a decrease in the number of putrefactive and other bacteria, as well as a decrease in the consumption of dissolved oxygen. The result of the increase of these microbial activities is that odors from gases such as methane, ammonia, and hydrogen sulfide gas are lessened, and the aerobic water Region S expands.

However, near the bottom of the water, which remains in an anaerobic state, layers of sludge composed of organic matter and organic compounds remain. This sludge becomes partially decomposed into gases such as carbon dioxide, methane gas, ammonia gas and hydrogen sulfide gas; however, in Region S of the upper hydrosphere, ammonia gas is ionized into nitrate ions, and hydrogen sulfide gas is decomposed into sulfur oxide. As a result, the source of the malodorous odors is steadily reduced.

FIG. 6 shows the second phase of the water purification process, where the polluted water has, to a certain degree, been purified through dissemination of the water purification agent via a drip distribution process.

As a result of continuous dissemination of the water purification agent, the water purification agent produces an antioxidant and antibacterial effect, creating catalytic reactions that increase the number of the useful microbes, as well as the level of activity of these microbes. In addition, the catalytic reactions lead to a decrease in the number of putrefactive and other bacteria, as well as a decrease in the consumption of dissolved oxygen.

The aerobic water Region S expands, resulting in a decrease in turbidity. At the bottom region of the water, the amount of organic matter and sludge broken down increases, and the volume of the sludge itself starts to decrease.

FIG. 7 shows the third phase of the water purification process, where polluted water is returned to an aerobic state through dissemination of the water purification agent via a drip distribution process.

Continuing to disseminate the water purification agent via a drip distribution process leads to the complete dissipation of gasses such as hydrogen sulfide gas and ammonia gas, and complete purification of the water.

At this stage, the aerobic water Region S has been expanded, resulting in an increase in dissolved oxygen and a decrease in turbidity. As such, rays of sunlight are able to pass through the surface of the water, allowing algae to grow, which brings about the production of oxygen through photosynthesis.

At the same time, in the bottom region of the water, the breakdown of built-up sludge reaches completion. Rays of sunlight are able to reach all the way to the bottom region of the water, allowing algae to grow there as well, which again leads to the production of oxygen through photosynthesis. Photosynthetic activity leads to a more effective breakdown of hydrogen sulfide gas, organic matter, and organic compounds.

Figure 8:
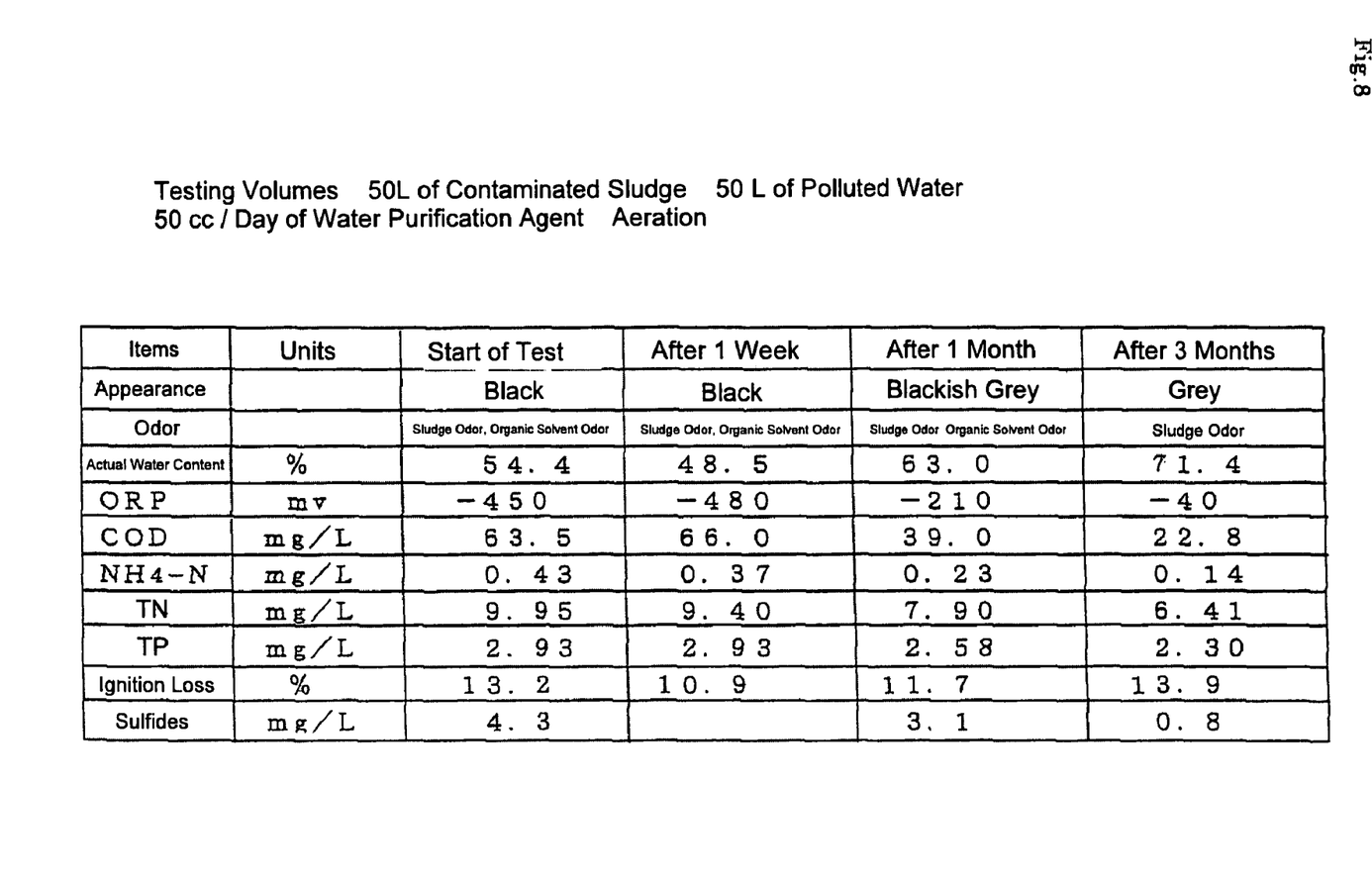
FIG. 8 is a table analyzing the effects of the water purification agent on sediments in laboratory tests.

FIG. 8 is a table analyzing the effects of the water purification agent on sediments in laboratory tests.

The following is a concrete description of the effect of the water purification agent for the present invention on sediments in the laboratory. 20 L of contaminated sludge and 20 L of water from a polluted river were used in the testing; 20 cc per day of the water purification agent was disseminated into the polluted water through a drip distribution process. The water was kept at 20° C.

Approximately three months after the testing started, the water changed from black in color to a dark grey. The strong smell of sludge and organic solvents had become just a faint sludge-like odor. The percentage of actual water content increased from approximately 54% to approximately 71%. The redox potential (mV) went from −450 mV all the way to −40 mV. The COD (Chemical Oxygen Demand in mg/g, dry) decreased, showing that the water was being purified. Levels of toxic substances such as nitrogen in the ammonia form, nitrogen in the organic form, total nitrogen content and total phosphorus content decreased.

Further, bubbles were generated immediately after the dissemination of the water purification agent.

Changes in the water contamination levels of the polluted water during testing are indicated in FIGS. 9 to 14. In the diagrams, solid lines represent changes after disseminating the water purification agent into the polluted water. The horizontal axis represents time, and vertical axis represents the degree of change.

Figure 9:
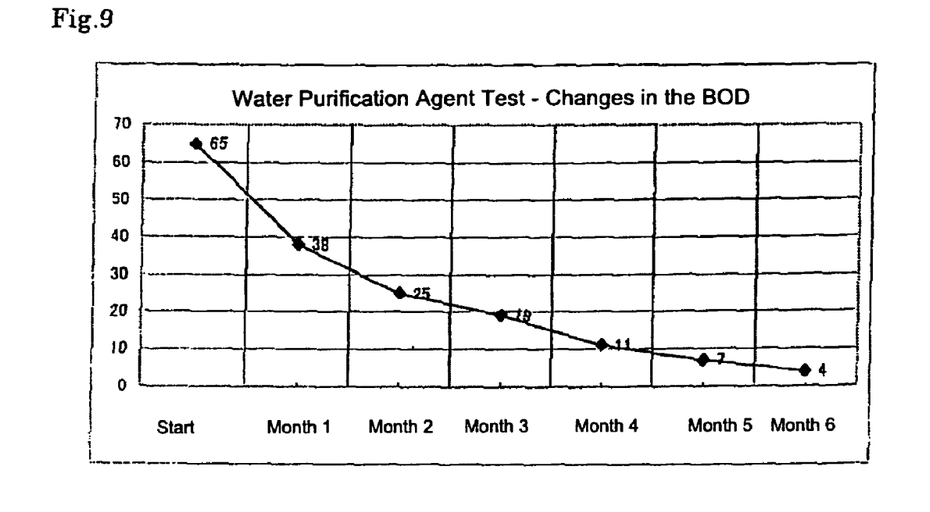
FIG. 9 is a graph representing changes in the BOD according to testing of the water purification agent.

FIG. 9 is a graph representing changes in the BOD according to testing of the water purification agent.

As indicated in the diagram, by disseminating the water purification agent into polluted water, the BOD (biochemical oxygen demand) in the polluted water can decreased dramatically. During the first month of the testing, odors became more faint, while the BOD readings decreased dramatically; after approximately six months, the degree of water purification had quite clearly improved.

Figure 10:
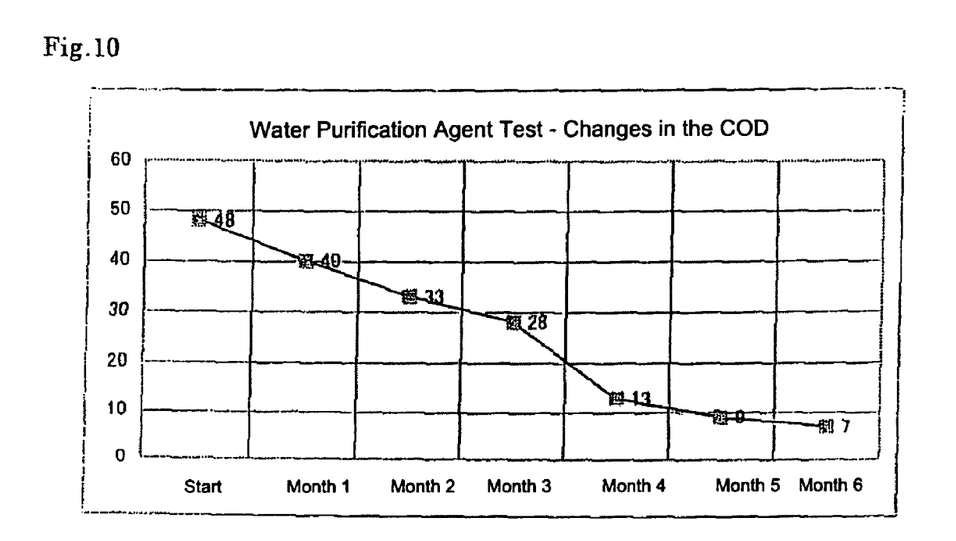
FIG. 10 is a graph representing changes in the COD according to testing of the water purification agent.

FIG. 10 is a graph representing changes in the COD according to testing of the water purification agent.

Disseminating the water purification agent into polluted water caused the COD (chemical oxygen demand) in the polluted water to decrease dramatically. During the first month of the testing, odors became more faint, while the COD readings decreased dramatically; after approximately six months, the degree of water purification had quite clearly improved.

Figure 11:
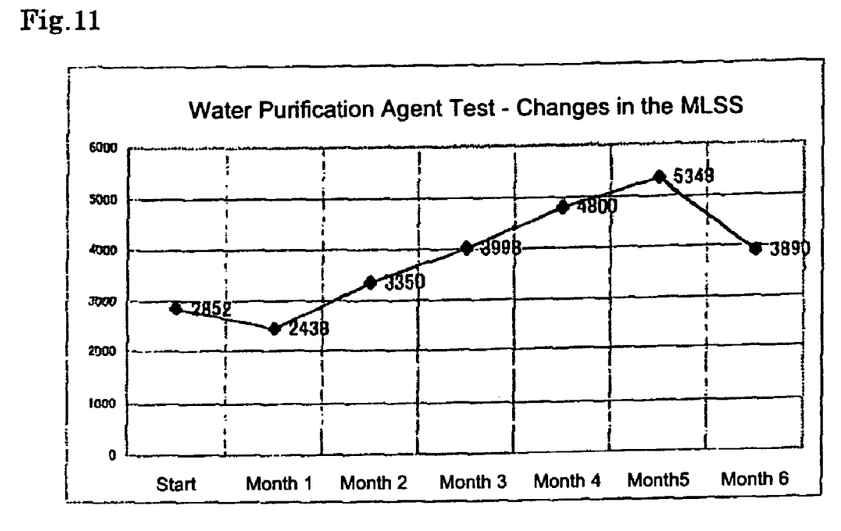
FIG. 11 is a graph representing changes in the MLSS according to testing of the water purification agent.

FIG. 11 is a graph representing changes in the Mixed Liquor Suspended Solids (MLSS) according to testing of the water purification agent.

Disseminating the water purification agent into polluted water led to an increase in the MLSS (Mixed Liquor Suspended Solids) readings, used to gauge the number of organisms in polluted water; at the same time there was a decrease in the volume of organic sludge.

Figure 12:
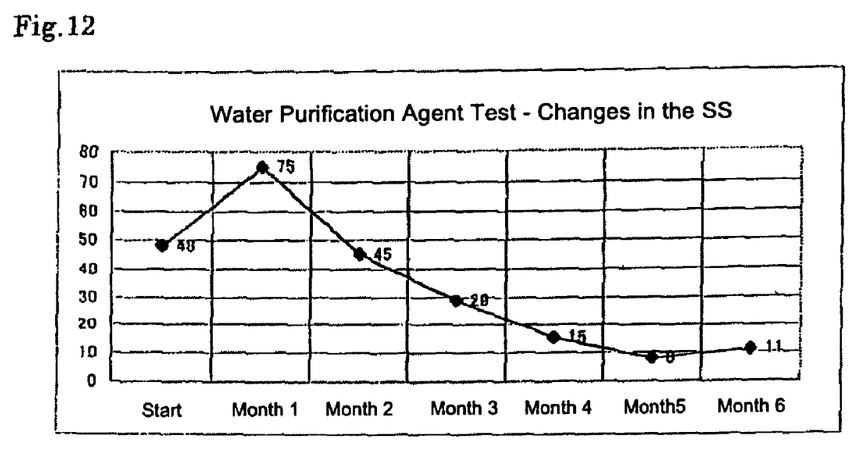
FIG. 12 is a graph representing changes in the SS according to testing of the water purification agent.

FIG. 12 is a graph representing changes in the Suspended Solids (SS) according to testing of the water purification agent.

Disseminating the water purification agent into polluted water led to a decrease in the SS (Suspended Solids) readings, which are used to gauge the number of organisms in polluted water; as well, there was a decrease in the volume of built-up sludge. The resulting environment is one that encourages the development of aquatic life and the growth of fish eggs in sand.

Figure 13:
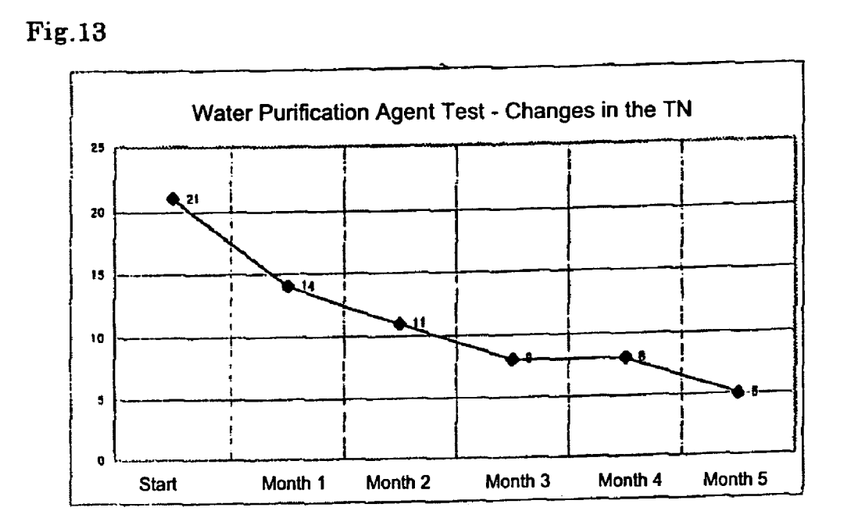
FIG. 13 is a graph representing changes in the TN according to testing of the water purification agent.

FIG. 13 is a graph representing changes in the Total Nitrogen Content (TN) according to testing of the water purification agent.

Disseminating the water purification agent into polluted water led to a decrease in Total Nitrogen Content readings, which are used to determine the nitrogen content in polluted water; at the same time there was a decrease in the volume of organic sludge.

Figure 14:
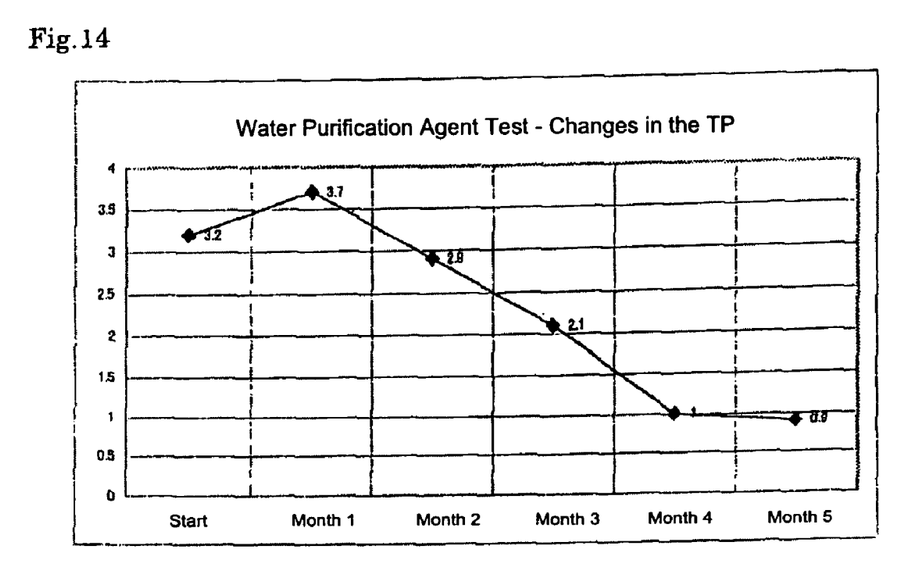
FIG. 14 is a graph representing changes in the TP according to testing of the water purification agent.

FIG. 14 is a graph representing changes in the Total Phosphorus Content (TP) according to testing of the water purification agent.

Disseminating the water purification agent into polluted water led to a decrease in Total Phosphorus Content readings, which are used to determine the phosphorus content in polluted water; at the same time there was a decrease in the volume of organic sludge.

Figure 15:
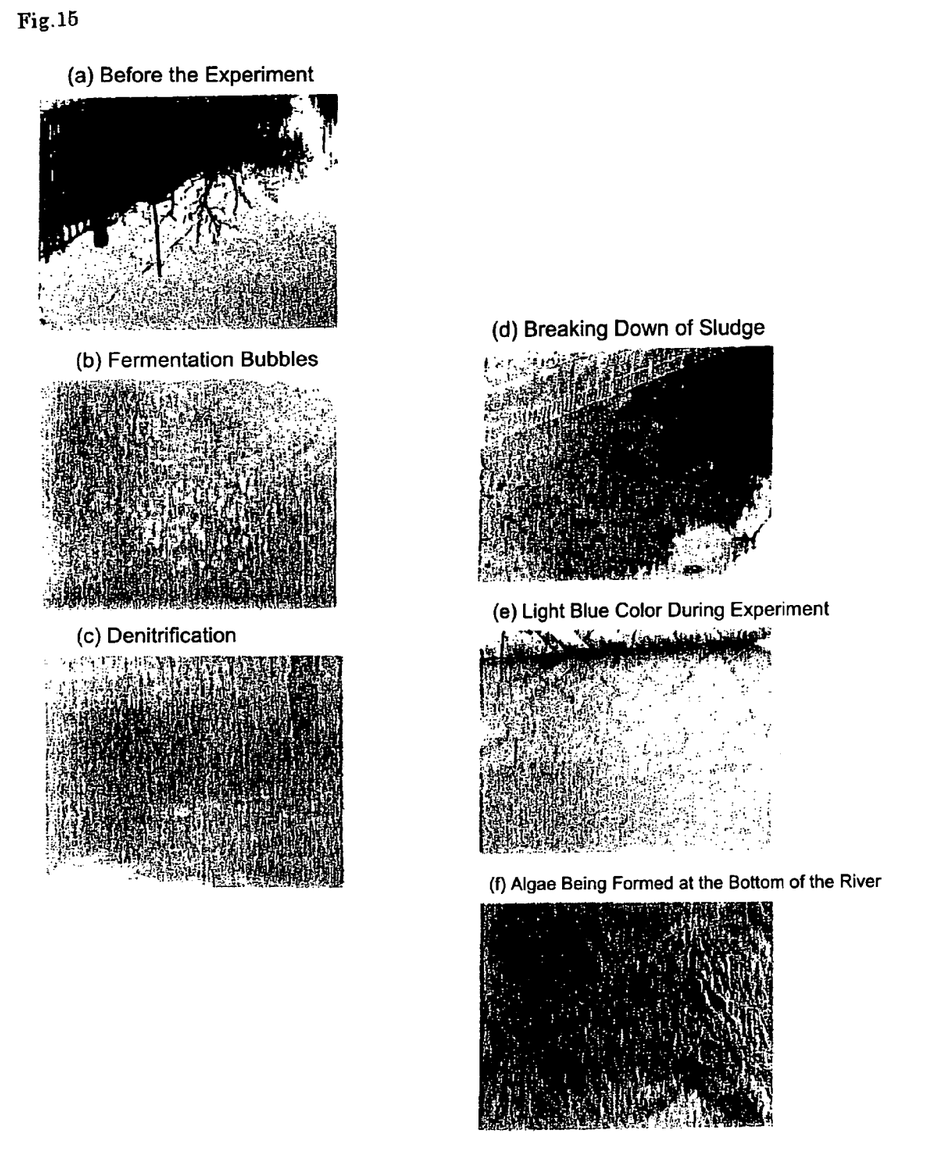
FIG. 15 shows the changes in regions of polluted water at a different river where the water purification method employing the activation of microbes was applied to regions of polluted water. (a) shows the original state of the water. (b) shows the state where, after dissemination of the water purification agent into the body of water via a drip distribution process, fermentation bubbles are generated. (c) shows the state where denitrification is occurring in the water. (d) shows the state where the breakdown of sludge has begun. (e) shows the state where the color of the surface of the water changes from a blackish brown, the color before the testing, into a light blue. (f) shows the state where algae is starting to grow at the bottom of the river.

FIG. 15 shows the changes in regions of polluted water at a different river where the water purification method employing the activation of microbes was applied to regions of polluted water.

The illustrations in FIG. 15 show the different states of the water when actually disseminating the water purification agent for the present invention via a drip distribution process into this different river.

(a) shows the original state of the water. The surface of the water is blackish brown in color.

(b) shows the state after disseminating the water purification agent into the water via a drip distribution process, where the breakdown of such substances as organic matter is progressing, causing the generation of fermentation bubbles.

(c) shows the state where denitrification is occurring in the water.

(d) shows the state where the breakdown of sludge has started.

(e) shows the state where the color of the surface of the water changes from a blackish brown, the color before the testing, into a light blue.

(f) shows the state where the purification of the water has progressed to the point where algae is starting to grow at the bottom of the river.

In the aforementioned examples, detailed explanations for dissemination of the water purification agent via a drip distribution process were mainly limited to publicly accessible bodies of water. However, the present invention is not limited to only these situations. For example, at water treatment plants, it is possible to distribute the water purification agent by spraying it around; in addition, since the water purification agent is in the form of a liquid, it is possible to use the water purification agent in a variety of different processing systems at these kinds of facilities. It will be understood that various changes may be made without departing from the scope of the invention.

APPLICABILITY IN INDUSTRIAL APPLICATION

As referred to above, the water purification agent employing catalytic reactions for the present invention is a mixture of natural enzymes, and substances that facilitate a catalytic reaction enabling the microbes in the polluted water to be activated, such as yeast. When disseminated into polluted water, the water purification agent enables microbes to survive easily in the polluted water. These microbes independently take in and expel enzymes, carry out decomposition reactions, break down toxic and other such substances, and carry out the reduction of oxidized water; in this way the polluted water is purified.

In addition, the water purification method employing the activation of microbes for the present invention can purify water by breaking down sludge, as well as toxic and other such substances, through the activation and activities of the microbes. The method for the present invention is easily employed for rivers, lakes, and water treatment plants. Further, since the water purification agent is in the form of a liquid, it is easy to handle; in addition, because the water purification agent can be disseminated via a drip distribution process into the targeted region of water, it is possible to maintain high levels of water purity over long periods of time, because the breakdown of toxic substances over long periods is possible. Further, since the drip distribution mechanism for the water purification agent is compact, it can be installed under bridges, making it possible to distribute the water purification agent evenly onto the surface of bodies of flowing water such as rivers. These are some of the effective applications of the present invention.

What is claimed is:

1. A water purification agent employing catalytic reactions, that, when disseminated into polluted water via a process of drip distribution, purifies said polluted water by breaking down pollutants contained therein; and that is of liquid form containing a mixture of the following: the enzyme bromelain extracted from pineapple juice, which when said enzyme is introduced into polluted water, purifies the polluted water by activating microbes that break down sludge and pollutants, including, but not limited to, organic compounds and sulfides: and a solution of yeast in citric acid water, which facilitates a catalatic reaction that enables the microbes existent in said polluted water to be activated.

2. A water purification agent employing the activation of microbes, where a drip distribution mechanism (2) attached to the underside of bridges (1) located in the vicinity of publicly accessible bodies of water is used to disseminate into polluted water via a process of drip distribution a water purification agent, affecting the activation of microbes that break down pollutants in said polluted water, which leads to the purification of said polluted water, where said bodies of water include, but are not limited to, rivers, lakes, dam reservoirs, harbors, bays, and coastal waters, and where said water purification agent contains a mixture of the enzyme bromelain extracted from pineapple juice, as well as a solution of yeast in citric acid water, which facilitates a catalytic reaction.

3. The water purification agent employing the activation of microbes according to claim 2, where said drip distribution mechanism (2) uses as a distribution pipe (3) a pipe that has multiple holes (4) for the purpose of drip distribution.

4. The water purification agent employing the activation of microbes according to claim 2, where said water purification agent is disseminated via a process of drip distribution into polluted water originating from facilities set up at factories and other worksites, which leads to the purification of said polluted water, and where said polluted water includes, but is not limited to, water polluted with contaminants and industrial effluent.

5. The water purification agent employing the activation of microbes according to claim 2, where said water purification agent is disseminated via said process of drip distribution into said polluted water, affecting the breakdown of sludge in the water.

6. The water purification method employing the activation of microbes according to claim 2, where said water purification agent is disseminated into said polluted water via said process of drip distribution, effecting purification of the water through the breakdown of pollutants including, but not limited to, organic compounds and sulfides, as well as through the reduction of oxidized water.

* * * * *